RESCUING DEVICE

Original Filed June 28, 1971 3 Sheets-Sheet 1

INVENTOR

OTTO BRDA

BY W. G. Cassa

ATTORNEY

RESCUING DEVICE

Original Filed June 28, 1971 3 Sheets-Sheet 2

INVENTOR

OTTO BRDA

BY W. G. Yasse

ATTORNEY

RESCUING DEVICE

Original Filed June 28, 1971 3 Sheets-Sheet 3

INVENTOR
OTTO BRDA

BY W. G. Fasse
ATTORNEY

United States Patent Office

Re. 28,273
Reissued Dec. 17, 1974

28,273

RESCUING DEVICE

Otto Brda, 10 Breitenau D-8112,
Bad Kohlgrub, Germany

Original No. 3,703,218, dated Nov. 21, 1972, Ser. No. 157,516, June 28, 1971. Application for reissue Oct. 19, 1973, Ser. No. 407,798
Claims priority, application Germany July 20, 1970, P 20 35 933.5
Int. Cl. A26b *1/14*
U.S. Cl. 182—6 14 Claims

Matter enclosed in heavy brackets [ ] appears in the original patent but forms no part of this reissue specification; matter printed in italics indicates the additions made by reissue.

ABSTRACT OF THE DISCLOSURE

Rescuing device for rescuing persons from the chairs of inoperative chairlifts or the like in which on a supporting member rollers are provided, against which the cable carrying the chairs is pressed by a braking plate, said braking plate being movable on the supporting member in a direction normal to the extension of the cable. On the braking plate spring means are acting, which can be compressed by an adjustable lever. On the supporting member there is provided a cylinder, supported by a freewheeling bearing rotatable in one direction of rotation and not rotatable in the other. A rope is wound around the outer periphery of the cylinder and to a first end of the rope a belt is connected such that a person to be rescued and sitting in the belt by its weight generates a frictional braking force between the rope and the outer periphery of the cylinder. A person participating in the rescuing operation can slide down an inclined cable to which the chairs are connected, while sitting on a transporting means connected to the supporting member and control its speed by operating the adjustable lever.

The invention relates to a rescuing device, in particular to a rescuing device which is useful in rescuing persons from chairs, which are connected to a rope or cable for the purpose of transporting persons above the ground over a certain height difference. Thus, the rescuing device can be used for rescuing persons from the chairs of chairlifts or ropeways and/or similar means for transporting persons along cables, ropes or the like over a certain height difference above the ground.

The rescuing device is used when said chairlifts or the like become inoperative because some malfunction occurs in their operating machinery, and when the persons sitting in the chairs are exposed to cold weather or other health hazards.

BACKGROUND OF THE INVENTION

Until now, the problem of rescuing persons from chairlifts inoperative in the course of some malfunction of the machinery driving the same has been severely neglected. [Howeber], *However* it is known to use a ladder or special towers and deploying them from the ground below the chair, but such method is limited to instances where the ground below is accessible for such deployment and where the height difference is not [to] *too* large.

Further it is known to provide along the cables, to which the chairs are connected, independent auxiliary cables, on which special cabins or other rescuing devices could be moved to reach the chairs and to rescue the persons sitting in them. Obviously, however, not all chairlifts are provided with such auxiliary cables and the corresponding rescuing cabins. The use of the known rescuing device is not possible, where such auxiliary cable are absent, since no provisions are made to continue the movement of these devices along the cable beyond the point at which a first chair is connected to the cable.

Further there are known devices enabling a person to slide down inclined cables (French Pat. No. 1,359,331); in such devices, the cable is extending between two rollers. A belt is connected to a supporting member, to which the rollers also are connected. The weight of a person, sitting in the belt, thereby is applied to the rollers in such a manner that the rollers are pressed against the cable in opposite directions and exert a wedging force on the cable, which can be released by the same person when shifting its weight from the belt to a lever also fixed to the supporting member.

Such devices do not have any means for rescuing a person. Further, the control of the speed, with which the person sitting in the belt can slide down the cable, is not satisfactory. In view of the fact that the speed is controlled by a wedging action effected by the weight of person and balanced by a continuous force applied to a lever by the same person, such control is not safe enough. Further, such device is not provided with means for continuing a ride down an inclined cable beyond the point at which a first chair, from which a person has to be rescued, is connected to the cable.

Similar devices have been known for transporting loads only and in which the control of the downward movement of the load along an inclined cable has been achieved by auxiliary cables connected to the device and connected to the upper station of the lift and operated therefrom (German utility model 1,792,632).

OBJECTS OF THE INVENTION

In view of the foregoing it is the aim of the invention to achieve the following objects, singly or in combination:

It is an object of the invention to provide a rescuing device with which a person participating in the rescuing operation can slide down a cable to which chairs are connected and easily and safely control his speed.

It is an object of the invention to provide a rescuing device, with which a person participating in the rescuing operation and sliding down a cable to which chairs are connected, can reach all chairs.

It is an object of the invention to provide a rescuing device by which a person sitting in a chair connected to an inclined cable can be lowered down to the ground below the chair without assisting in its own rescue operation.

It is an object of the invention to provide a rescuing device, in which a control of the speed with which a person to be rescued can be lowered down to the ground, can be controlled by a force much less than the force exerted by the weight of said person.

It is an object of the invention to provide a rescuing device in which a person to be rescued can himself control the speed, at which he is lowered to the ground.

It is a further object of the invention to provide a rescuing device in which the objects of the invention as mentioned in the foregoing paragraphs can be achieved with a high degree of safety and ease and especially without any danger of tangling of the ropes necessary for lowering down the movement of the person to be rescued.

It is a still further object of the invention that, after rescuing a person, the upward movement of the end of the rope to which the person to be rescued has been connected can be easily achieved.

It is a still further object of the invention to provide a connection of the person to be rescued with the rescuing device which without any change in its dimension, is equally useful in rescuing persons of extremely heavy and extremely light stature and which can be positioned around the person to be rescued without its own assistance.

It is a still further object of the invention to provide a rescuing device which is simple in construction, reliable and safe in operation and easy to handle.

SUMMARY OF THE INVENTION

A rescuing device for rescuing persons from the chairs of ropeways, chairlifts and the like [over] comprises a supporting member, to which rolling means are attached. The rolling means are brought to roll on the cable, against the other side of which frictional breaking means are pressed by an adjustable member acting on the frictional breaking means via compressible spring means. The supporting member further is provided with cylinder means, which are supported in a free-wheeling manner in order to be rotatable only in one direction of rotation and blocked in the other direction of rotation; further, there are provided rope means, which are wound around the cylinder means at least one and a half times; belt means are connected to the first end of said rope means, this first end, when being pulled, acting on said cylinder means in the direction in which a rotation is not possible. Further, transporting means are connected to said supporting member such that a first person sitting on the transporting means and operating the adjustable member can slide down the inclined cable to bring the device into the vicinity of a second person to be rescued and fasten the belt means around said second person. Then, the second person can controlledly be moved down to the ground by gradually releasing the second end of the rope means and thereby allowing for a frictional movement of said rope means around the cylinder means in the direction in which the rotation of the cylinder means is blocked.

BRIEF FIGURE DESCRIPTION

DETAILED DESCRIPTION OF THE PREFERRED EMBODIMENT

Figure 1:
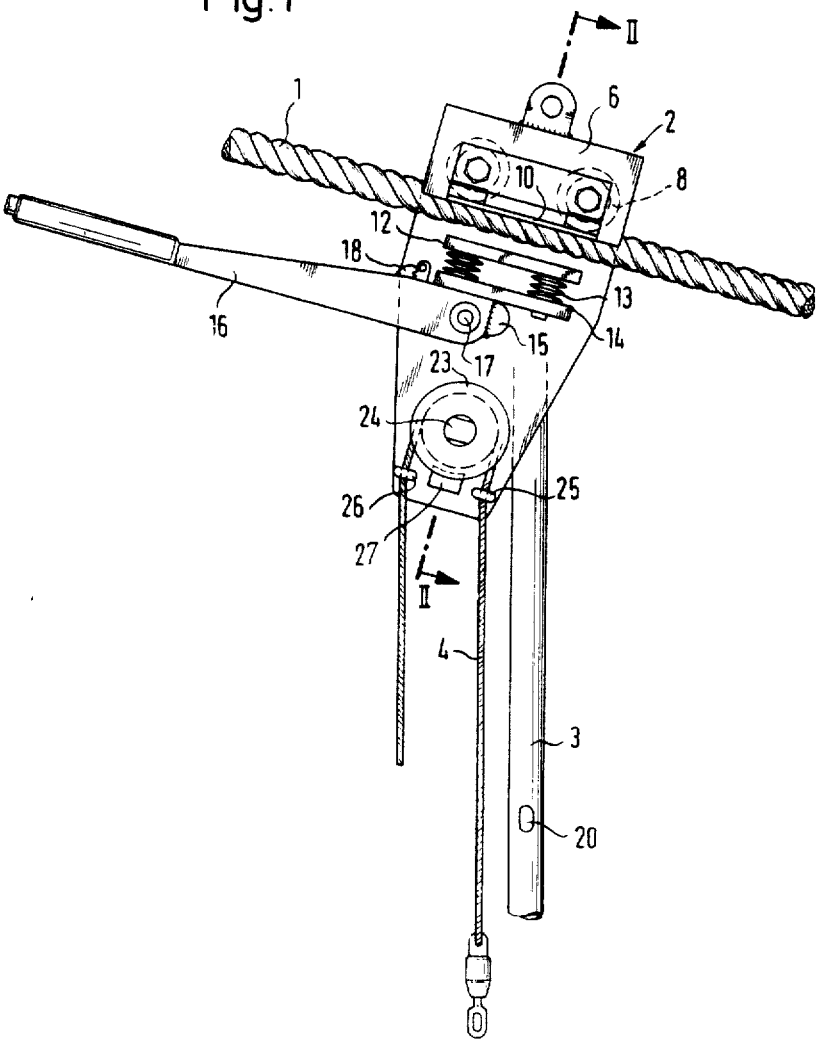
FIG. 1 is a partial side view of a rescuing device according to the invention.

In FIG. 1, the numeral 1 indicates a cable, to which at certain distances chairs are connected (not shown) in which persons can be transported above the ground to overcome a certain height difference. E.g. the cable 1 is part of a chairlift or ropeway as used for transporting persons on skislopes. From these chairs persons must be rescued when the lift becomes inoperative because of some malfunction occurs in the associated machinery.

Figure 2:
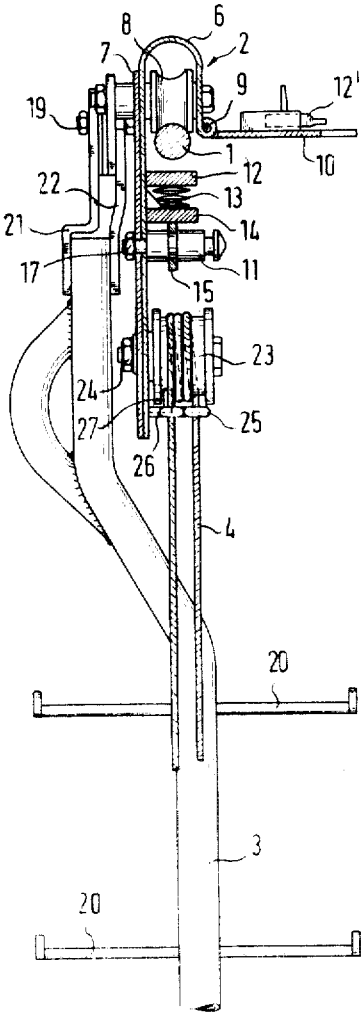
FIG. 2 is a cross-sectional view along the line II—II in FIG. 1.

On the cable 1, there hangs the rescuing device 2, which, as can be seen from FIG. 2, comprises a U-shaped supporting member 6. One leg *of* the member 6 is [enforced by an enforcing] *secured to a* plate 7, to which at 19 there are pivotally connected two connecting plates 21 and 22. The plates 21, 22 are fixed to a vertical extending bar 3, which carries a plurality if horizontal extending bars 20, to form a ladder-type transporting means which is part of the rescuing device 2.

Between the two legs of the upper portion of the U-shaped supporting member 6 there are provided two rollers 8. They constitute rolling means, by which the rescuing device can roll along the cable 1. As can be seen from FIG. 1 and FIG. 2, this rescuing device is hanged on the cable 1 in such a manner that the rollers 8 come to bear on the upper side of said cable.

Beneath the cable 1 there is provided a braking plate 12, which serves as a frictional braking means. It is guided in slots (not shown), provided in the left (in FIG. 2) leg of the supporting member 6, said slots receiving protruding extensions of said plate 12. The guiding arrangement is such [said] *that* the plate 12 can be moved in a direction normal to the direction, in which the cable 1 extends beneath the rollers 8.

In the position as shown in FIG. 1 and FIG. 2, the distance between the rollers 8 and the plate 12 is such that by moving the rescuing device over the cable 1, the cable 1 practically is inserted in the space between the roller 8 and the plate 12 is pressed against the lower surface of the cable 1 in order to provide a frictional braking force between them and thereby effect a braking action. This is achieved by spring means 13 provided between the braking plate 12 and a further plate 14 is movable in *the* same manner and direction as the plate 12. In the embodiment shown in FIG. 1 and FIG. 2, the spring means 13 are formed by disk-shaped plate-springs 13, provided in two packages (cf. FIG. 1) to exert an equal pressure along the extension of the braking plate 12 on the same. The use of other suitable spring means, e.g., leaf springs or laminated springs is possible.

The plate 14 can be moved in the direction normal to the extension of the cable 1 through the rescuing device by cam means 15, which are an integral part of a lever 16 and fixed to it e.g. by welding.

The lever 16 is pivotally connected to the supporting member 6, as indicated at 17. By operating the lever 16 in down-ward direction (FIG. 1), the cam 15 presses the plate 14 in a direction normal to the cable 1. Via the spring 13, the braking plate 12 is also moved, until it comes into contact with the cable 1. Upon a further movement of the lever 26, since further movement of the braking plate 12 is limited by its contact to the cable 1, the springs 13 are compressed. Consequently, by adequately positioning the lever 16 and thereby moving the plate 14, the springs 13 can controllably be compressed and thereby the pressure exerted by them upon the braking plate 12 and via the same on the cable 1 *may* be easily controlled.

The lever 16 is adjustable and for this purpose is provided with notches 18, which fit into a member connected to the supporting member 6 and provided with grooves corresponding to the notches 18. The notches 18 are pressed into engagement with the grooves by suitable spring means (not shown), arranged within the lever. They can be released by pushing a knob provided at the end of the adjustable lever 16. Thus, any desired force between the braking plate 12 and the cable 1 can be achieved and exactly adjusted by changing the position of the lever 16 without the necessity of a force being continuously applied by the person riding with the rescuing device down a cable 1 and sitting on the ladder-type transporting means.

The right leg of the U-shaped upper part of the supporting member 6 at its end is at 9 pivotally connected to a locking plate 10, which, as shown in FIG. 2, can be opened in such a manner that the cable 1 can easily be brought into the open space between the rollers 8 and the braking plate 12, when the braking plate 12 is in the position as shown in FIGS. 1 and 2. On the locking plate 10, there is provided a suitable lock 12', which, when the locking plate is moved down to the right to extend parallel to the other [oeg] *leg* of the supporting member 6, engages an annular groove provided in the member 11, which is supported by the supporting member 6, and which at the same time serves as a pivot for the adjustable lever 16. Thus, by locking the locking plate 10 and the lock 12' (both designated as locking means) in the annular groove of the member 11, the cable is completely surrounded in a cage-like manner and secured against an accidental slip out of the contact of the rollers 8 and the braking plate 12 respectively. This feature is of importance for providing a high degree of safety.

On the left leg of the supporting member 6, there is further provided a cylinder 23 supported by a shaft 24, fixed to the supporting member 6. The bearing of the cylinder 23 is such that the cylinder can be rotated in one direction of rotation only, whereas the rotation in the other direction of rotation is blocked. The construction of such a free-wheeling bearing is known in the art. It basically consists of cylindrical rollers inserted between the inner hub of the cylinder 23 and the shaft 24 and a specially constructed ring (not shown), which in one direction of rotation of the cylinder 23 guides the rollers to act as wedges between said ring and the inner hub of the cylinder 23 and thereby blocks the rotation, whereas no such wedging action is achieved in the other direction of rotation and the cylinder 23 is therefore freely rotatable.

As can be seen from FIG. 2, the cylinder 23 is provided with flanges. Around the cylinder a rope 4 is wound two and a half times. As a consequence of the cylinder 23 being rotatable in one direction only, when one end of the rope is pulled, the cylinder is rotated correspondingly, whereas, when the other end of the rope is pulled, the cylinder 23 does not rotate with it, such that a frictional force between the rope 4 and the surface of the cylinder 23 must be overcome in order to achieve a movement of the rope 4. Consequently, if a load is connected to said last mentioned end of the rope, it can be easily balanced by a fraction of the force applied to the other end of the rope. The relation between those two forces is well known.

For "holding" a load which is equivalent to the weight of a person, it has been found that with the present invention there is only necessary a force of approximately 10–15 kg.

For increasing the safety of the rescuing device as shown, there are provided first guiding means 25 and 26 for guiding the ends of the rope 4 at a predetermined position to and away from the cylinder 23. Further, there are provided second guiding means 27, connected to the supporting member 6, which (cf. FIG. 2) prevent a displacement of the windings of the rope wound around the cylinder 23 in the direction of the axis of rotation of the cylinder, when the cylinder is rotated by pulling one end of the rope. This exactly defines the position of the rope 4 on the cylinder 23 during operation.

Figure 3:
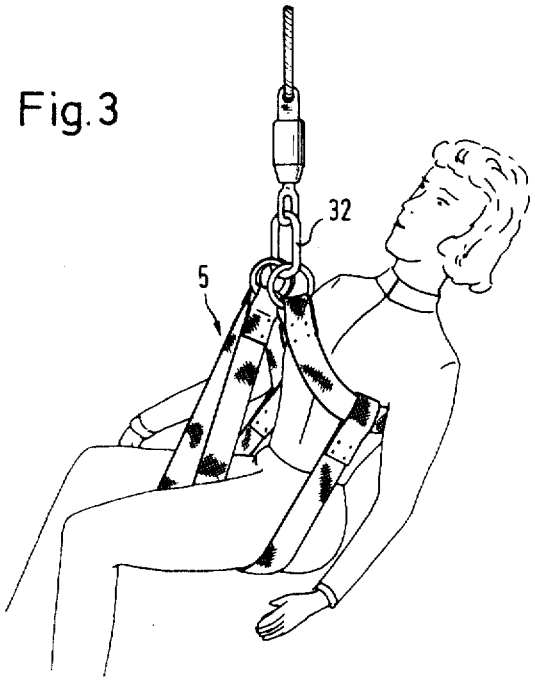
FIG. 3 is a view of the belt means connected to the rope means in the rescuing device and fastened around a person to be rescued.
Figure 4:
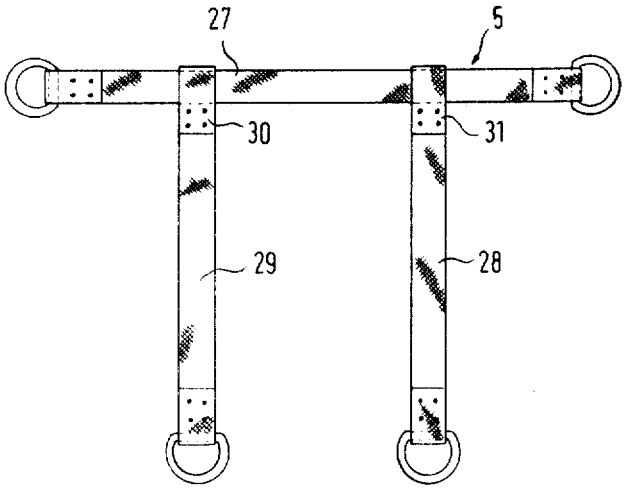
FIG. 4 is a view of the belt means used in FIG. 3.

When the first end of the rope 4 is defined as being the one, which when pulled effects a frictional movement of the rope 4 along the surface of the blocked cylinder then the person to be rescued is connected to this first end of the rope, as can be seen from FIG. 3. This person is sitting in a belt 5, which is more clearly shown in FIG. 4. The belt 5 consists of one horizontally extending member 27 and two further members 28 and 29, extending normally thereto and movable on the member 27 with loops provided at their ends 31 and 33. The horizontally extending member 27 of the belt 5 is put around the back of the person to be rescued; it extends under the arms of that person and from there[on] in upward direction. The members 28, 29 are then put from the outside around the upper legs of the person to be rescued, extending therefrom in upward direction along the inner side of the legs. All four ends, to which rings are connected, are then held together by a spring safety hook 32 connected to the end of the rope 4.

OPERATION

In operation, the rescuing device 2 as shown in FIGS. 1 and 2 is put over the cable 1 such that the cable 1 is positioned between the rolling means 8 and the frictional braking means 12. Then, via the adjustable lever 16, the plate 14, and the spring means 13, pressure is applied to the plate 12 to bring it into contact with the cable 1. Initially, the pressure is such that no movement of the rescuing device 2 along the inclined cable 1 is possible. Then, a person participating in the rescuing operation mounts the rescuing device by steppng on the transporting means 3, 20.

The person pushes the knob on the lever 16 and then slowly releases the pressure exerted by the cam means 15 via the plate 14 on the springs 13 by changing the position of the lever 16. Thereby the pressure exerted by the braking plate 12 on the cable 1 is gradually decreased. As a consequence, the rescuing device 2 begins to slide down the inclined cable 1.

When the rescuing device 2 and the rescuing person sitting on the ladder-type transporting means 3, 20 reaches the first hair connected to the cable 1, from which a second person is to be rescued, the first [peron] *person* again pulls the lever 16 such that the sliding movement of the rescuing device 2 down the inclined cable 1 comes to an end. The person then steps from the ladder-type transporting means 3, 20 on the chair, from which the second person has to be rescued, and fastens the belt 5 around said person in the manner described above. It has to be emphasized that no help on part of the person to be rescued is necessary as a consequence of the special construction of the belt 5.

After connecting the first end of the rope 4 to the rings provided at the ends of the belt members 27, 28, 29 the rescuing operation begins.

The second end of the rope is slightly pulled. By this pull, the cylinder 23 is rotated and the person to be rescued and sitting in the belt 5 is slightly lifted such that he can be moved out of the chair; he is now freely suspended in the air. This pulling can be done either by the first person mentioned which rides down the cable 1 with the rescuing device 2 or by a third person from the ground.

Then, the second end of the rope is slowly released. This release again is done either by a third person standing on the ground below the chair or by the first person which has been sliding down the inclined cable 1 with the rescuing device 2. It also can be done by the person to be rescued himself, if he is still capable of providing help in [its] *his or her* own rescuing operation. During this part of the operation, the feature of the present invention becomes important, which lies in the fact that only a small force is necessary to control the downward movement of the person to be rescued and connected to the first end of the rope 4.

After this part of the rescue operation has been completed and the person to be rescued has been disconnected from the belt, the second end of the rope 4 is pulled. Without any frictional resistance between the rope and the cylinder the first end of the rope again is [liefted] *lifted* to adequate height.

Then the person, who initially rode down the inclined cable 1 with the rescuing device 2, completely releases the adjustable lever 16 and opens the locking means 10, 12' and takes the whole rescue device 12 from the cable 1. He puts it again on the cable 1, but in a position downwards of the cable behind the point at which the chair, from which a person has been rescued as described above, is connected to the cable. He then closes the locking means 10, 12' and adjusts the lever 16 in such a manner, that no movement of the rescuing device 2 is possible. He then again mounts the rescuing device 2 and starts a further ride down the cable 1 by gradually releasing the lever 16. The rescuing operation is then continued as often as it is necessary to reach all chairs connected to the cable 1.

The selection of the materials to be used for the cylinder 23 and the rope 4 has to be such that the heat being generated by the frictional movement of the rope 4 during the lowering of a person to be rescued can easily be tolerated. The material, from which the cylinder 23 is made, has been preferably [a] *an* aluminum alloy of the type AlCuMgPb. Its heat-conductivity is sufficient. As a material for the rope 4, a synthetic material such as a polyamid which is available under the registered trade mark "Perlon," has led to satisfactory results. A suitable [diametor] *diameter* of the rope 4 is 9 mm.

What I claim is:

1. [REscuing] *Rescuing* device for rescuing persons from ropeways, chairlifts and similar means for transporting persons along cables, ropes or the like over a certain height difference above the ground, comprising a. a supporting member;

b. rolling means provided on said supporting member for movement along the rope or cable;

c. frictional braking means, provided on said supporting member and movable thereon, which in a first position contact the rope or cable to exert a frictional braking force on the same and in a second position provide a predetermined space between the braking means and the rolling means;

d. spring means acting on said frictional braking means;

e. an adjustable member to compress said spring means to increase the pressure acting on said frictional braking means;

f. cylinder means supported on said supporting member by a free-wheeling bearing means, which allow a rotation of the cylinder means in one direction of rotation and block their rotation in the other direction of rotation;

g. rope means, wound around the cylinder means at least one and a half times;

h. belt means releaseably connected to the first end of said rope means, whereby this first end acts on said cylinder means in the direction, in which a rotation of the cylinder means is blocked;

i. transporting means connected to said supporting member; such that a first person sitting on the transporting means and operating the adjustable member can slide down an inclined rope or cable into the vicinity of a second person to be rescued and fasten said belt means around said second person, and wherein the second person can controlledly be moved down by gradually releasing the second end of said rope means.

2. Rescuing device in accordance to claim 1, further comprising guiding means attached to the supporting member for guiding the ends of said rope means at a predetermined position to and away from said cylinder means.

3. Rescuing device in accordance to claim 2, further comprising second guiding means attached to the supporting member for preventing a movement of the rope means in the direction of the axis of the cylinder means;

4. Rescuing device as claimed in claim 1 wherein said cylinder means are made from heat-conductive material, and wherein said rope means are made from a material essentially not losing its strength at the temperaure generated when said rope means are frictionally moving around the surface of the cylinder means in the direction of the rotation, in which the cylinder means can not be rotated.

5. Rescuing device as claimed in claim 4, wherein the cylinder means is made of an aluminum alloy and wherein the rope means is a polyamide material.

6. Rescuing device in accordance to claim 1 wherein further there are provided locking means for closing the space between the supporting member, the rolling means, and the frictional braking means, to completely surround the rope means.

7. Rescuing device as claimed in claim 1 wherein the adjustable member is provided with cam means to act on said spring means and further is provided with notches releasably engaged with grooves provided on the supporting member.

8. Rescuing device in accordance to claim 1 wherein the transporting means comprise essentially vertically extending first bar means connected to said supporting member and further essentally horizontally extending bar means connected to said first bar means.

9. Rescuing device in accordance to claim 6, wherein the upper end of the supporting member is essentially U-shaped and the rolling means are arranged between the downward extending legs of said U-shaped upper end of the supporting member, and wherein a first leg of the supporting member further is provided with means for guiding the movement of the frictional braking means and wherein further the transporting means are connected to said first leg of the supporting member and the second leg of the supporting member at its end is connected to a locking means, which can be locked to form an enclosed space surrounded by the first leg of the supporting member, the rolling means, the frictional braking means, and the locking means and wherein the cylinder means are connected to the first leg of the supporting member.

10. Rescuing device in accordance to claim 1 wherein said belt means comprise a. a first member with fastening means connecting its two ends;

b. two further member, the first ends of which are slideably connected to the first member and the second ends of which are also provided with fastening means.

11. Method for rescuing persons from a chair or similar transporting means connected to an inclined rope or cable, by which said persons are transported above the ground, comprising the following steps:

a. [Positioning] *positioning* a rescuing device on the rope or cable such the rope or cable is located between rolling means and frictional [breaking] *braking* means, each provided on a supporting member;

b. [Applying] *applying* pressure to said frictional braking means via spring means and an adjustable member;

c. mounting transporting means provided on said supporting member;

d. gradually decreasing said pressure by operating the adjustable member and thereby controlledly sliding down the rope or cable until a chair connected to said rope or cable is reached;

e. applying pressure to said frictional braking means via the spring means and the adjustable lever;

f. positioning belt means around the person to be rescued and connecting the belt means to a first end of a rope means wound around at least one and a half times around a cylinder means supported on supporting member and rotatable thereon in one direction only, said first end when be pulled, exerting force on the cylinder means in the direction in which the rotation thereof is blocked;

g. gradually releasing said second end of the rope means and thereby moving the person to be rescued to the ground by a frictional movement of the rope means along the cylinder means;

h. [Releasing] *releasing* the frictional braking means from the rope or cable and positioning the rescuing device again on the same, but in a position after the connection of the chair to the cable.

*12. Belt means for suspending a person from a support, comprising a first belt member with two ends, fastening means secured to both ends for attachment to said support, second and third belt members each having a first end and a second end, sliding fastening means, slideably connecting said first ends of the second and third belt members to said first belt member, and further fastening means secured to the second ends of the second and third belt members also for attachment to said support.*

*13. The belt means of claim 12, wherein said first ends of said second and third belt members are provided with loops for slideably affixing said second and third belt members to said first belt member.*

*14. The belt means of claim 12, wherein said fastening means and said further fastening means, comprise rings.*

References Cited

The following references, cited by the Examiner, are of record in the patented file of this patent or the original patent.

UNITED STATES PATENTS

| | | | |
|---|---|---|---|
| 3,177,544 | 4/1965 | Murdock | 182—5 |
| 3,403,750 | 10/1968 | Pomagalski | 182—189 |
| 2,844,187 | 7/1958 | Scoville | 182—36 |

| | | | |
|---|---|---|---|
| 2,225,177 | 12/1940 | McAlvay | 182—193 |
| 422,345 | 2/1890 | Harman | 182—7 |
| 2,344,031 | 3/1944 | De Shano | 182—6 |
| 3,322,102 | 5/1967 | Windle | 182—3 |
| 2,132,556 | 10/1938 | Blackshaw | 119—96 |
| 1,642,911 | 9/1927 | Thurnau | 182—3 |

REINALDO P. MACHADO, Primary Examiner

U.S. Cl. X.R.

182—193; 119—96